United States Patent Office 3,441,721
Patented Apr. 29, 1969

3,441,721
DEVICE FOR GAUGING THE EFFECT OF THE CARGO DISTRIBUTION ON A VESSEL
Ferenc Arpas, Goteborg, and Clas Ove Thorsson, Torslanda, Sweden, assignors to Aktiebolaget Gotaverken, Goteborg, Sweden
Filed Dec. 13, 1965, Ser. No. 513,501
Claims priority, application Sweden, Dec. 21, 1964, 15,472/64
Int. Cl. G06g 7/70
U.S. Cl. 235—150.2        6 Claims

ABSTRACT OF THE DISCLOSURE

For determining the influence of the cargo distribution on a ship an apparatus has been used which comprises a Wheatstone bridge and a series of resistors, each resistor being settable to represent the load in a particular compartment of the ship and the influence of said particular load upon bending moments and shearing forces with respect to a certain transverse plane in the ship.

The present apparatus is a development of the former designs, and is adapted for gauging the bending moments, shear forces, deadweight and draft of a ship in relation to any of a number of previously chosen transverse sections in the ship, thereby also taking into account the displacement in the longitudinal direction of the ship of the point of gravity within each compartment of the ship.

---

Methods and devices for gauging the effect of the cargo distribution on a vessel are previously known and by their use the vessel is presumed to be longitudinally divided into a number of cross sections, whereafter the forces acting in said cross sections, viz. the cargo weight, the hull weight and the buoyancy of the cross sections on different sides of a predetermined transverse plane, are balanced against each other, preferably by aid of a Wheatstone bridge circuit. Said bridge circuit comprises members by the aid of which the magnitudes of said forces are introduced into said bridge circuit in the form of voltages or currents or they are represented by resistances of said bridge circuit. Said previously known methods, however, have the grave disadvantage that the gauging of the effect of the cargo distribution on said vessel, e.g., the transverse forces and bending moments generated in the hull, only can be determined in a single preselected plane, usually the central transverse plane, or possibly in two fixed planes.

One of the objects of the present invention, therefore, is to set aside said disadvantage and to provide a device by aid of which the shearing forces and the bending moments can be determined at several transverse planes of the vessel.

Another object of the invention is to provide a device of the type stated, by which the necessary calculations can be performed without manual calculations and with a minimum of tabular work.

A preferred embodiment of the device according to the invention will in the following be described with references to the accompanying schematical drawings in which FIGS. 11 and 12 show the circuit when the transverse force and the bending moment respectively for the plane D in FIG. 1 are gauged.

Figure 1:
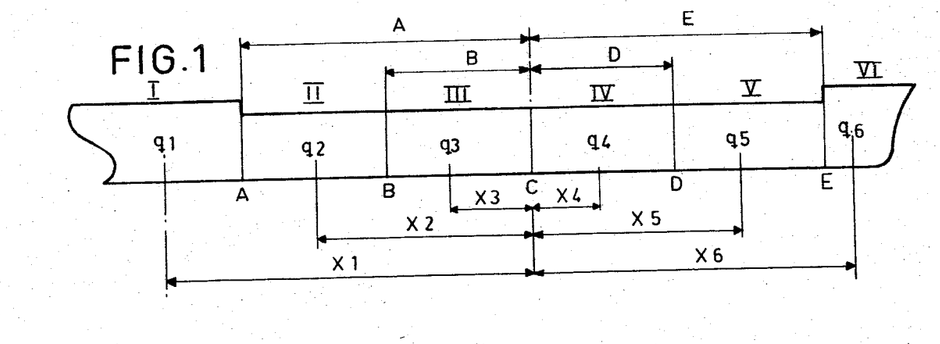
FIG. 1 shows the outline of the hull of a vessel, divided into six cross sections.

In order to facilitate the understanding of the invention the theoretical speculations and mathematical equations on which the invention is based will be given below with reference to FIG. 1 which diagrammatically shows a longitudinal section of a vessel.

As shown in said figure the vessel is assumed to be divided into six cross sections I–IV by transverse planes A–E. The load in each section then amount to:

$$q = W_E + W_P - W_B \qquad (1)$$

where $W_E$ is the downwardly directed force of the hull weight,
$W_P$ is the downwardly directed force of the cargo weight, and
$W_B$ is the buoyancy.

If the number of cross sections is $m$ ($m$ here=6) the shearing force Q in a plane N will be:

$$Q_N = q_1 + q_2 + q_3 \ldots q_n = \sum_1^n q_i = -\sum_{n+1}^m q_i \qquad (2)$$

The calculation of the bending moment in an arbitrary plane is based on a main plane with respect to which the moments of said forces $W_E$, $W_P$ and $W_B$ are determined, and the moment sum in a plane thus is:

$$m = m_{iE} + m_{iP} - m_{iB}$$

If the plane C is chosen as the main plane it follows that:

$$M_C = \sum_1^3 m_{iE} + \sum_1^3 m_{iP} - \sum_1^3 m_{iB} =$$
$$\sum_4^6 m_{iB} + \sum_4^6 m_{iP} - \sum_4^6 m_{iB} \qquad (3)$$

where $m_{iE}$, $m_{iP}$ and $m_{iB}$ are the moments of the hull weight, the cargo weight and the buoyancy respectively or:

$$M_C = \sum_1^3 m_i = \sum_4^6 m_i$$

but $m_i$ can also be termed $q_i \cdot x_i$, where $x_i$ is the distance from the center of gravity of the cross section to the main plane.

The moment in an arbitrary plane astern of the main plane C, i.e., plane B thus is:

$$M_B = \sum_1^2 m_i - 1_B \sum_1^2 q_i \qquad (4)$$

or according to the Equation 2

$$M_B = \sum_1^2 m_i + 1_B \sum_3^6 q_i \qquad (5a)$$

Thus, the moment in an arbitrary plane can be calculated by aid of the sum of the moments with respect to the main plane of the cross section positioned on one side of the measuring plane, the sum of the loads of the cross sections on the opposite side of the measuring plane and the distance of the main plane from the measuring plane, which last term forms the only variable, which is dependent on the position of the measuring plane. This feature contributes to a great extent to the simplification of the invention.

The corresponding equation for a plane ahead of the main plane C, i.e., the plane D reads as follows:

$$M_D = \sum_5^6 m_i + 1_D \sum_1^4 q_i \quad (5b)$$

Figure 2:
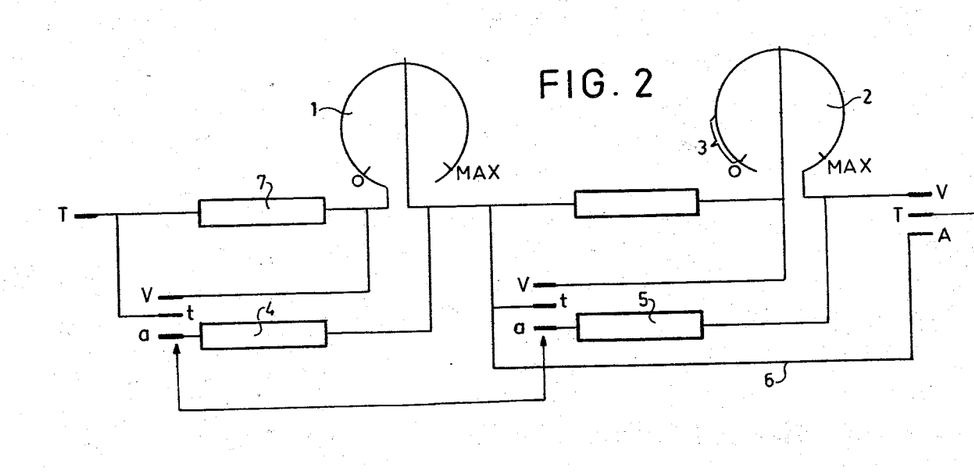
FIG. 2 shows a resistor group for introducing the forces of one of such a cross section into the bridge circuit.

Thus, to be able to perform the necessary gauging it is therefore required to provide the quantities corresponding to the factors $q_1$ and $m_1$ in the different cross sections. This is accomplished by the aid of the same number of resistor groups as there are cross sections in the vessel. One of said resistor groups for a cross section of the vessel is shown in FIG. 2.

The resistor group comprises a potentiometer 1 which is adjustable to a resistance representing the cargo weight stored in said cross section at the measuring moment. The adjustment knob of the potentiometer is therefore preferably graded in tons. A second potentiometer 2 is arranged in the resistor group, said second poteniometer being adjustable to represent the buoyancy of the cross section in question, and as the buoyancy is active in the opposite direction to the cargo weight, said two potentiometers are counterconnected. The buoyancy of the vessel cross section is dependent of the displacement of the section which in its turn is dependent of the draft (draught Eng.) of said cross section. The adjustment knob of the second potentiometer 2 is therefore preferably graded in feet or meters. The resistor group furthermore contains a fixed resistance, representing the constant hull weight of the vessel cross section which ressitance can be included in the potentiometer 2 or have the form of a resistor 3, connected in series with said potentiometer 2.

The potentiometers 1 and 2 may be so constructed as by fixed settings to give the value $q_1$, i.e., the sum of the cargo weight, the hull weight and the buoyancy, or they can be constructed to give the moment of said sum with respect to the main plane. However, as both the quantity $q_1$ and the quantity $m_1$ are needed in different gaugings, said resistor group also comprises shunting resistances 4 and 5 which are optionally connectable to transform the quantity $q_1$ into the quantity $m_1$ or vice verse. Furthermore, the hull weight and the buoyancy are not included in certain gaugings which are described below, wherefore each resistor group finally also includes a conduit 6 by aid of which said potentiometer 2 and said resistor 3 can be short-circuited. If desired the resistor group can also comprise a resistor 7 in series in the known manner to increase the accuracy of the resistor group.

Figure 3:
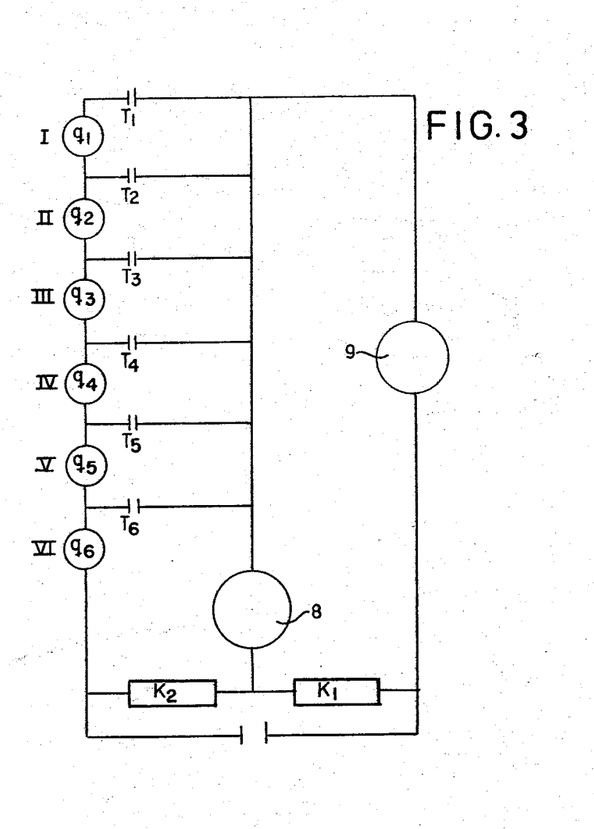
FIG. 3 shows the principle for connecting the bridge circuit for guaging the shearing forces in different transverse planes.

The shearing force in an arbitrary transverse plane can thus be calculated from the Equation 2 by summing the loads $q_1$ in the cross sections on one side of the measuring plane. FIG. 3 shows diagrammatically the fundamental circuit for determining the transverse forces in a number of transverse planes or bulkheads of the vessel. The resistor groups corresponding to the different sections are connected in series in the Wheatstone bridge in order from stern to bow of the vessel. Furthermore the bridge circuit includes in known manner two comparison resistors $K_1$ and $K_2$ in series and a galvanometer 8 in a conduit extending from the junction between said comparison resistors $K_1$ and $K_2$ to the junction of the two branches of the bridge circuit. Said bridge circuit also contains a potentiometer 9, the resistance of which is varied to balance the bridge circuit and the adjustment knob which is graded in such a way that the required value of the transverse force in a chosen plane is directly readable. The potentiometer 9 may either be connected with one end of the coil and the sliding contact in the other branch of the bridge circuit as shown in FIG. 3, or in an equally known manner be connected with the potentiometer coil between the branches of the bridge circuit and the sliding contact in the conduit to the galvanometer 8.

Conduits with circuit breakers $T_1$–$T_6$ are connected to the junctions between each pair of resistor groups in such a way, that each conduit, when the circuit breaker therein is operated, short-circuits the resistor groups situated between the connection point and the galvanometer 8. By successively operating the circuit breakers $T_1$–$T_6$ the set values of resistor groups can thus in succession be added to the set value of $q_1$ of the first resistor group I, and thereby the shearing forces in the planes A–E are readable at the potentiometer 9 when the galvanometer 8 is set to zero.

Figure 4:
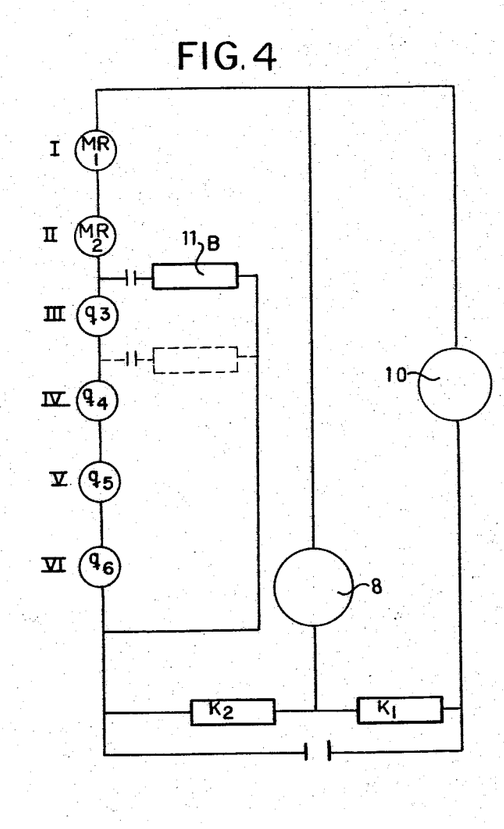
FIG. 4 shows the bridge circuit principle for gauging the moments in different planes.

FIG. 4 shows diagrammatically a preferred ciruit to gauge the moment in a transverse plane, viz the plane D. In this circuit all the resistor groups I–VI for the different cross sections are also connected in series in succession from stern to bow in one of the branches of the bridge circuit, and a potentiometer 10 for reading the value of the moment is included in the other branch in one of the ways stated with reference to the potentiometer 9 of FIG. 3. The resistor groups corresponding to the cross sections on one side of the measuring plane, i.e., the resistor groups V and VI are set to represent the moment of the two cross sections loads respectively with respect to the main plane. However, the remaining resistor groups I–IV, which correspond to the cross section on the other side of the measuring plane, are set to represent the cross section loads and according to Equation 2 the sum thereof is equal to the shearing force in the measuring plane. The last mentioned resistor groups I–IV are shunted by a resistor $11_D$ transforming said transverse force in the measuring plane into the moment of same with respect to the main plane. The resistor groups thus satisfy the right member of the Equation 5b and the potentiometer 10 will thus satisfy the left member thereof and state the value $M_D$ when the bridge circuit is balanced.

In this gauging the cross sections astern of the measuring plane are evidently included with their load setting, when said measuring plane is positioned ahead of the main plane, while the cross sections ahead of the measuring plane are included with their load values and the sections astern of the measuring plane with their moment values when said measuring plane is positioned astern of said main plane. When the measuring plane and the main plane coincide, all the cross sections are included with their moment values.

As stated above, the potentiometer 1 in each resistor group is set according to the weight of the cargo stored in the corresponding cross section or intended to be stored therein, and therefore on basis of known or assumed quantities. The potentiometer 2, however, is set on basis of the draft (draught) of the cross section, which in its turn is dependent on the mean draft (draught) of the vessel and the trim position thereof. These quantities may also be determined by the device according to the present invention as will be described in the following.

Figure 5:
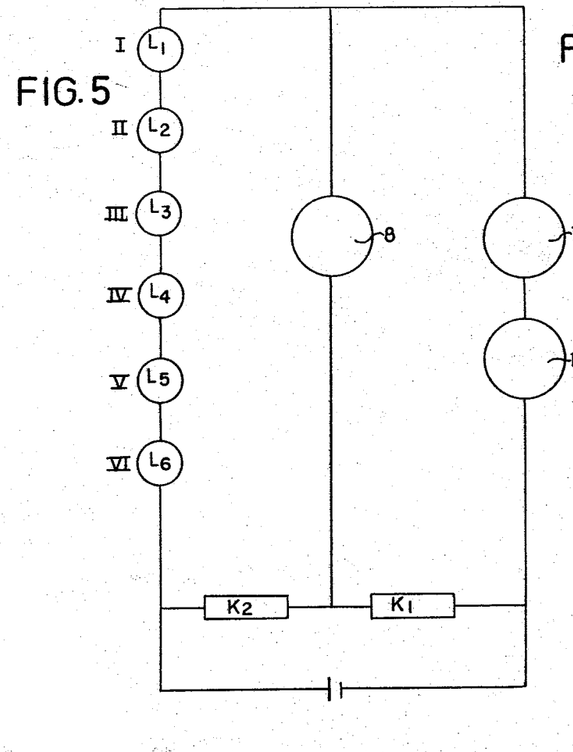
FIG. 5 shows the bridge circuit principle for determining the dead weight of the vessel, FIG. 6 in the same manner shows the bridge circuit for determining the mean draft (draught Eng.)

The mean draft (draught) of the vessel is calculated on the basis of the actual dead weight thereof. To determine said dead weight all the resistor groups I–VI are included in series in one branch of the Wheatstone bridge as is diagrammatically shown in FIG. 5 and the resistor groups are set to represent the load caused by the cargo, i.e., the buoyancy potentiometer 2 together, with the hull weight resistor 3 of each resistor group are short-circuited. The dead weight is provided by a direct summing of the cargo weight values of the resistor groups when the bridge circuit is balanced by aid of a switchable multistep resistor 12, which is so constructed that the resistance increases with a constant amount every time the multistep resistor is adjusted from one poition to the next higher position and each step of the multistep resistor 12 therefore corresponds to a constant increase of the dead weight. A potentiometer 13 is arranged in series with said multistep resistor 12 and the adjustment position of said potentiometer indicates the part of the dead weight falling between the adjustment of the multistep resistor and consecutive higher adjustment thereof. When the bridge circuit is balanced the dead weight may be read as the sum of the indications of the multistep resistor 12 and of the potentiometer 13.

Admittedly the mean draft (draught) of the vessel is dependent of the dead weight thereof, but an increase of the dead weight by a certain number of tons does not produce the same increase of the mean draft (draught), for instance when the vessel is empty and when it is partly loaded. In order to get a satisfactory value of the mean draft (draught) the constant resistances of the steps of the multistage resistor 12 cannot be used. Said resistor 12 is therefore mechanically coupled to another switchable multistage resistor 14 (FIG. 6) which is so constructed that each step thereof corresponds to the increase of the draft (draught) caused by an increase of the dead weight within the corresponding step of the multistep resistor 12. The resistances of the steps of the resistor 12 are constant as stated before so that the total resistance increases with a constant value with each higher adjustment, while the resistances of the resistor 14 decreases for each higher step so that the increase of the total resistance becomes lesser with an increasing cargo weight on board the ship.

As already stated the purpose of the potentiometer 13 is to bridge the constant steps of the multistep resistor 12, but as said steps are not constant when the mean draft (draught) is to be measured, the potentiometer 13 must be adapted thereto. This is accomplished by connecting a fixed resistor 15 parallel to said potentiometer 13.

The resistances stated above can be used to gauge the mean draft (draught) of the vessel according to the equation $$d_1+d=konst=B$$

in which $d_1$ is the resistance set by aid of the dead weight resistor 12 and the dead weight potentiometer 13, and which gives $$d=B-d_1 \qquad (6)$$

Figure 6:
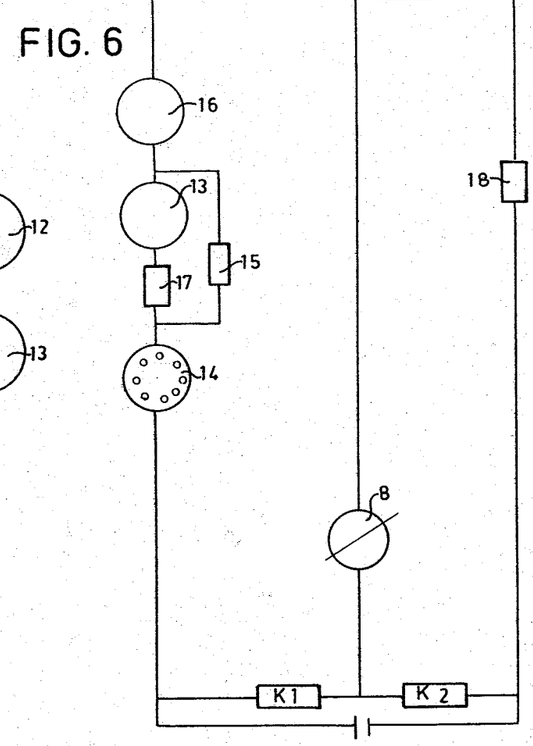

The principle according to which this is accomplished is shown in FIG. 6. The above described switchable multistep resistor 14 set at the value corresponding to the value of the dead weight preestablished before at the multistep resistor 12 is included in one branch of the Wheatstone bridge. The dead weight potentiometer 13 with its parallel resistor 15 is connected in series therewith, whereby the adjustment of the potentiometer earlier established must not be changed. A potentiometer 16 indicating the draft (draught) is finally connected in series in the circuit. To increase the accuracy of measurement of the bridge circuit another fixed resistance 17 may in the known manner also be included in series with the dead weight potentiometer 13 inside the shunt thereof. A fixed comparison resistance is included in the other branch of the bridge circuit and same is balanced by aid of the potentiometer 16 indicating the draft (draught) on which the mean draft (draught) can be read directly in feet or meters.

It is, however, necessary to gauge the draft (draught) in all the cross sections to be able to set the buoyancy potentiometers 2 of the resistor groups I–IV and therefore consideration must be taken to the trim position of the vessel, which causes the drafts (draughts) ahead and astern of the center of flotation to differ when the trim differs from zero. According to the invention this gauging of is made by measuring the draft (draught) both in a point ahead of and in a point astern of the center of flotation. It is thereby principally possible to choose any arbitrary transverse plane as measuring plane, but for practical reasons it is best to take the measurements in the stern and bow perpendiculars.

The stern draft (draught) is arrived at as the mean draft (draught) with the addition or reduction of the changes in the draft (draught) at the stern perpendicular, caused by the trimming moment of the set cargo weight, hull weight and buoyancy at the existing mean draft (draught), viz.:

$$d_A = d - T \cdot X$$

$$T = \frac{-M_{ET} - \sum_1^3 m_{ip} + \sum_4^6 m_{ip} - M_{BT}}{M_{CT}}$$

Which in combination with the Equation 6 for the mean draft (draught) gives:

$$\sum_1^3 m_{ip} - (d_i+d_A)\frac{M_{CT}}{X} = \sum_4^6 m_{ip} - M_{ET} - M_{BT} - \frac{B \cdot M_{CT}}{X}$$

in which

T is the trim, whereby
$M_{ET}$ is the trimming moment of the hull weight,
$M_{BT}$ is the trimming moment of the displacement,
$M_{CT}$ is the moment for one unity trimming change, and
X is the distance between the center of flotation and the stern perpendicular divided by the total length of the vessel.

The stem draft (draught) is $$d_F = d + T(1-X)$$

which in the same way as above gives:

$$\sum_4^6 m_{ip} - (d_i+d_F)\cdot\frac{M_{CT}}{(1-X)} = \sum_1^3 m_{ip} + M_{ET} + M_{BT} - B\cdot\frac{M_{CT}}{(1-X)}$$

Figure 7:
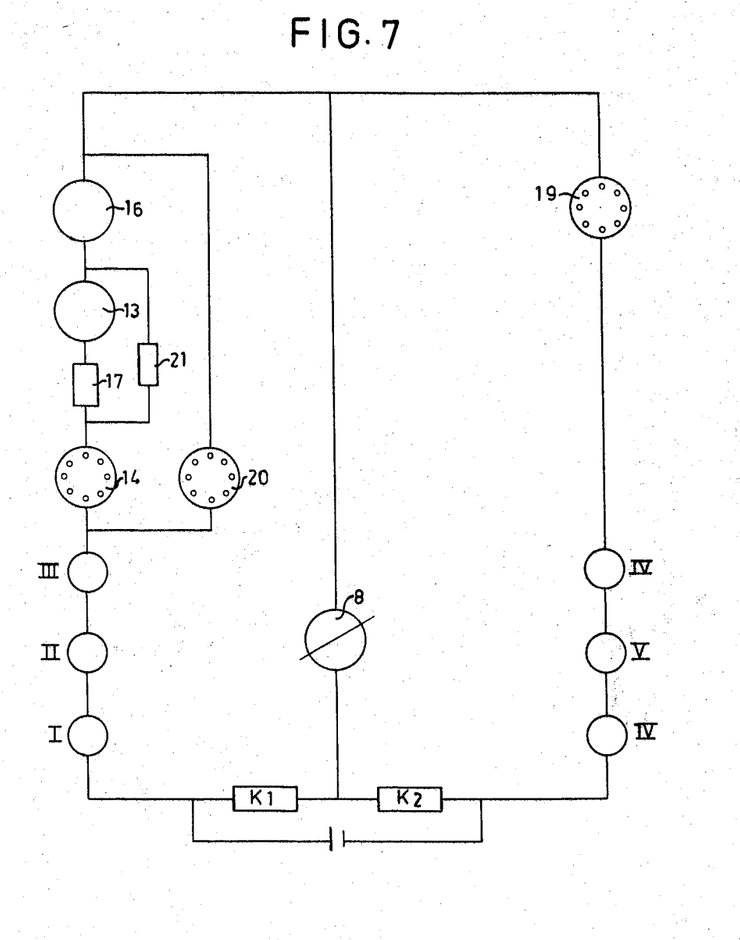
FIGS. 7 and 8 show the bridge circuit when determining the stern draft (draught Eng.) and the bow draft (draught) respectively.

The principles for gauging the stem draft (draught) is diagrammatically represented in FIG. 7 from which can be seen that the resistor groups IV–VI ahead of the main plane C are connected in series with each other in one branch of the Wheatstone bridge, each set at the value of the moment of the load with respect to the main plane. The same branch further includes in series a switchable multistage resistor 19, corresponding to the trimming moment of the hull weight and the displacement with respect to the main plane at the valid mean draft (draught). Said multistep resistor 19 is thus dependent on the multistep resistor 14 described above and therefore also dependent on the dead weight multistep resistor 12, so that the multistep resistor 19 also may be mechanically coupled to said other two multistep resistors. The resistor groups I–III for the cross sections astern of said main plane are included in the other branch of the bridge circuit and the circuit for measuring the mean draft (draught) according to FIG. 6 is also included in this branch with unaltered setting of the multistep resistor 14 and the dead weight potentiometer 13. This last mentioned circuit is shunted by a further switchable multistep resistor 20, so chosen that the potentiometer 16 indicating the draft (draught) after being adjusted to set the galvanometer 8 on zero gives the sum of the mean draft (draught) and the draft (draught) change caused by the difference between the moment sum of the sets of resistor groups. As the resistance of the shunt multistep resistor 20 is also dependent on the mean draft (draught), the construction thereof corresponds to the previously stated multistep resistors and is also mechanically coupled thereto.

To increase the accuracy of measurement of the gauging of the stern draft (draught) it is furthermore advantageous to replace the fixed in parallel connected resistor 15 comprised in the circuit for the gauging of the mean draft (draught) by another fixed resistor 21, so that the value of resistance is changed in conformity with the change of the center of buoyancy caused by the draft (draught) changes within the steps of the multistep resistor.

Figure 8:
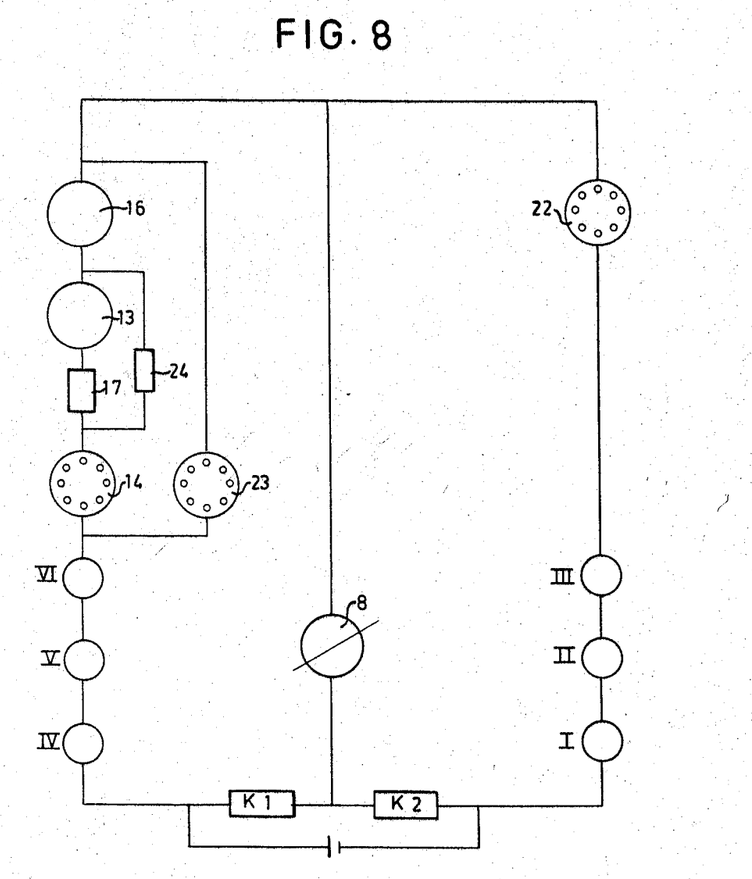

The circuit for the measuring of the draft (draught) at the bow perpendicular is shown in FIG. 8 and corresponds in principle with what is described above with reference to FIG. 7. As shown in FIG. 8 the resistor groups I–III for the cross section of the vessel astern of the main plane C are connected in series with each other in one branch of the bridge circuit, and a switchable multistep resistor 22 corresponding to the trimming moment of the hull weight and the displacement with respect to the main plane at the existing mean draft (draught) is also included in this branch. Said multistep resistor 22 conforms constructively with the already described multistep resistors 12, 14, 19 and 20 and is mechanically coupled to same.

The remaining resistor groups IV–VI and the circuit for measuring the mean draft (draught) is connected in the other branch. Thereby the circuit for measuring the mean draft (draught) is shunted by another switchable multistep resistor 23 and the fixed resistor 15 of the circuit is replaced by a fixed resistor 24, said multistep resistor 23 and the fixed resistor 15 of the circuit is replaced by a fixed resistor 24, said multistep resistor 23 and fixed resistor 24 respectively having the same function as the multistep resistor 20 and the fixed resistor 21 for the gauging of the stern draft (draught). The bow draft (draught) is read directly on the potentiometer 16 when the bridge circuit is balanced.

It should not cause a ship building expert any difficulties to follow the arguments and the therefrom following equations state above and it is also evident that the described measuring circuits satisfy corresponding equation.

On the basis of the established values for drafts (draughts) at the stern and the bow perpedicular the drafts (draughts) of all the cross sections I–VI can easily be calculated. According to the invention this is done by the aid of a diagram 25 mounted on the instrument board 26 of the device. Said diagram 25 (FIG. 9) shows the longitudinal center section of the vessel with the different measuring planes A–E marked thereon. A vertical line is drawn through the center of gravity of each cross section I–VI and vertical lines also mark the stern and bow perpendicular respectively. All said lines are furthermore graded so that the draft (draught) in feet or meters for each cross section can be read at the points of intersection between said vertical lines and a straight line extending through the points of stern and bow drafts (draughts) corresponding to the valid values.

Figure 9:
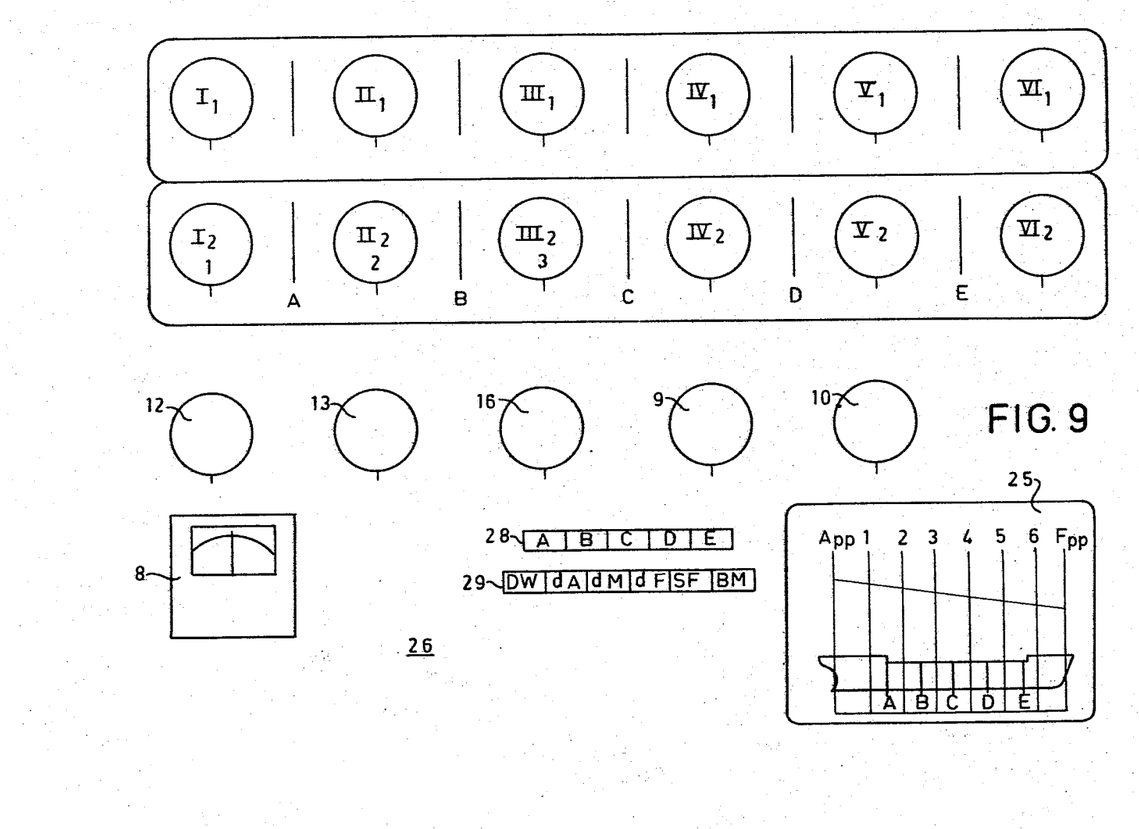
FIG. 9 shows the panel of the device according to the invention.

In the following the device according to the invention will be described with reference to FIG. 9 and 10. The construction and use of the device can easily be derived from FIG. 10–16, which are circuit diagrams of the device adjusted for the measuring of the different quantities as stated above and shown in the same order of succession.

The device is provided with an instrument board 26 containing a top panel on which setting knobs for the cargo weight potentiometers 1 and the buoyancy potentiometers 2 of the cross sections I–VI are arranged. In FIG. 9 said knobs are identified by the reference numerals $I_1, I_2; II_1, II_2; \ldots$ and the same reference numerals have been used for the potentiometers in the circuit diagrams 10–16.

On a lower panel of the instrument board the galvanometer 8 of the Wheatstone bridge is arranged together with adjustment knobs for the dead weight multistep resistor 12 and all the other multistep resistors mechanically coupled therewith, the dead weight potentiometer 13, the potentiometer 16 for reading the drafts (draughts), the potentiometer 9 for reading the shearing forces and the potentiometetr for reading the bending moments. Furthermore the instrument board 25 comprises two rows 28 and 29 of keys, the top row 28 being used to choose the measuring plane, whereby the described embodiment includes six such keys marked with the same letter as the corresponding transverse plane A–E. The bottom row 29 is used to choose the measuring function and comprises the following keys, which are pressed down when the device is to be set in order for the corresponding gauging, viz W for gauging the dead weight, $d_A$ for stern draft (draught), $d_M$ for mean draft (draught), $d_F$ for bow draft (draught), SF for the shearing force in a plane chosen by aid of one key in the top row 28, and BM for gauging the bending moment in a plane chosen by one of the keys in the top row 28.

The different keys cooperate with relay means which in a generally known manner establish the different circuits as is evident from FIGS. 10–16.

Figure 10:
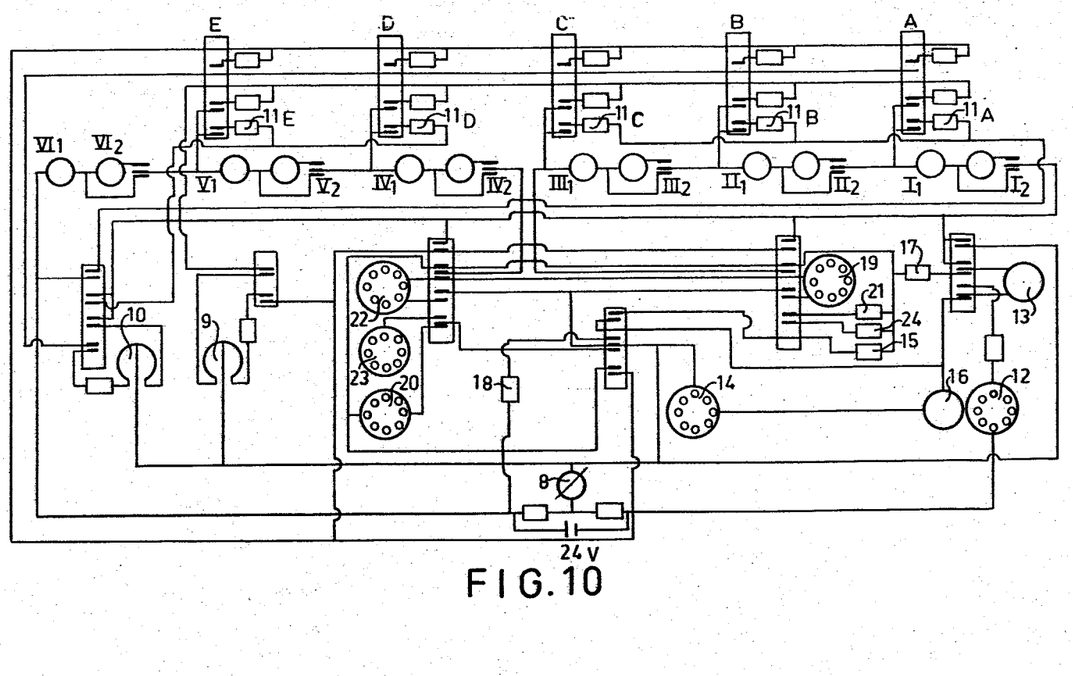
FIG. 10 is a general circuit diagram of the device according to the invention and FIGS. 11–16 show the same circuit diagram as FIG. 10 with the connections shown in FIGS. 3–8 respectively marked with dotted lines parallel to the conduits, included in the different bridge circuits. Thereby
Figure 11:
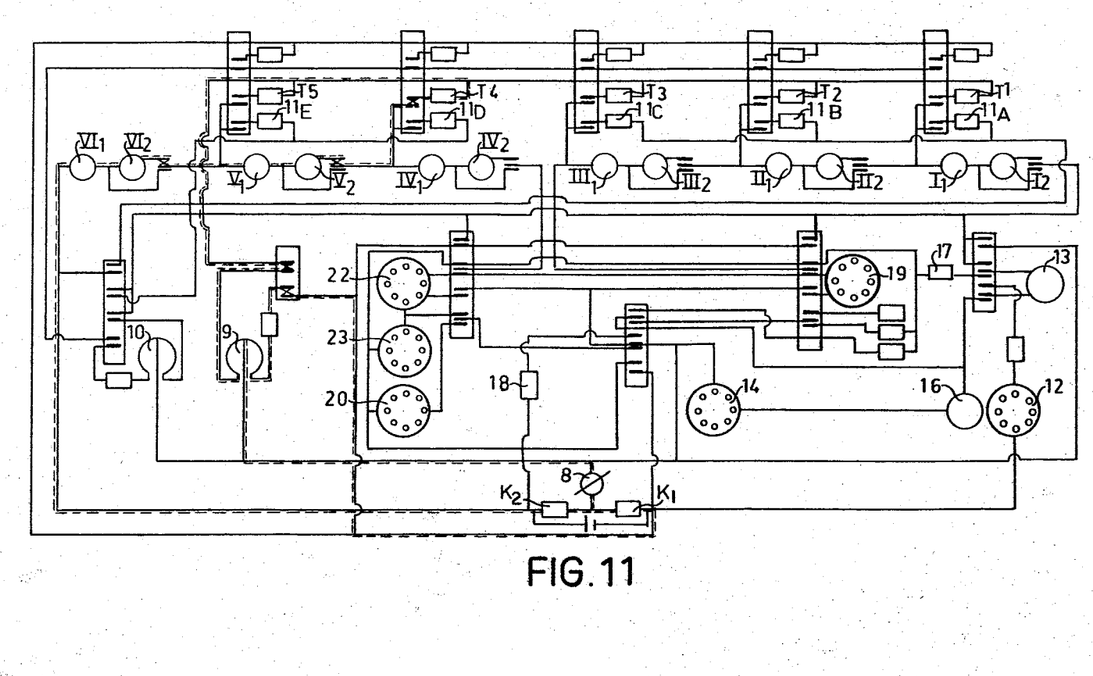

FIG. 10 shows how the potentiometers and the resistors necessary for the device according to the invention are arranged and it should be superfluous further to describe the device with reference to said diagram, as the diagram itself undoubtedly can be understood by aid of the inserted reference numerals marking the same means as in the already described figures.

When the shearing force in one plane shall be gauged the key SF in the bottom row 29 is pressed down and the key in the top row 28 corresponding to said plane is also pressed down. Thereby the bridge circuit is completed in the way described with reference to FIG. 3, which is marked in FIG. 11 by dotted lines running parallely to the conduits that form the bridge circuit for measuring the transverse force in the plane D.

Figure 12:
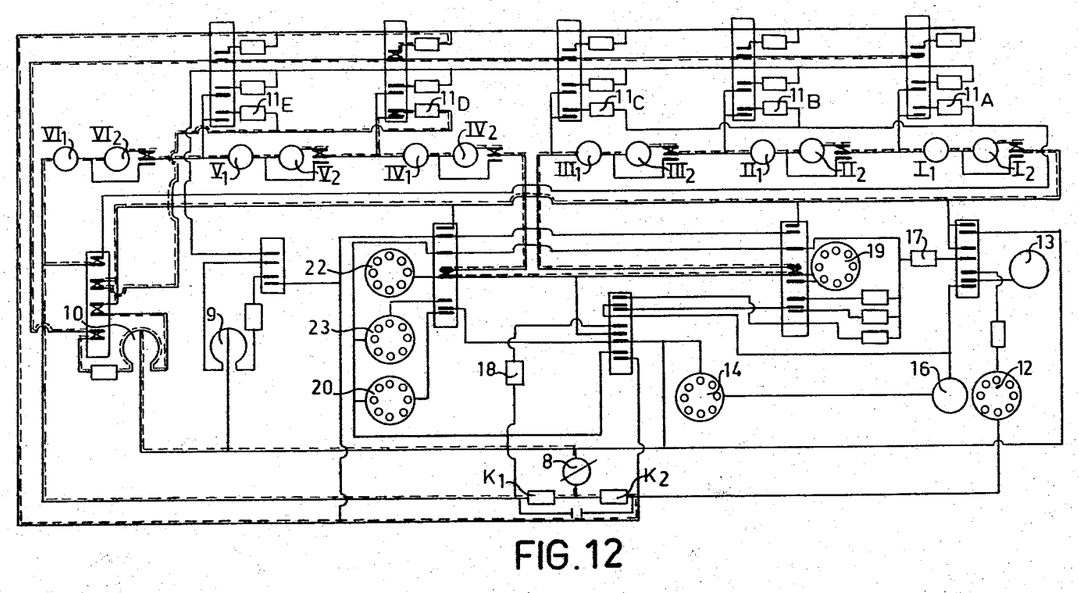

When the moment in a plane is to be gauged the key BM in the bottom row 29 and the key of said plane in the top row 28 are depressed. Thereby a circuit is established which is marked in the stated manner for the plane D.

Figure 13:
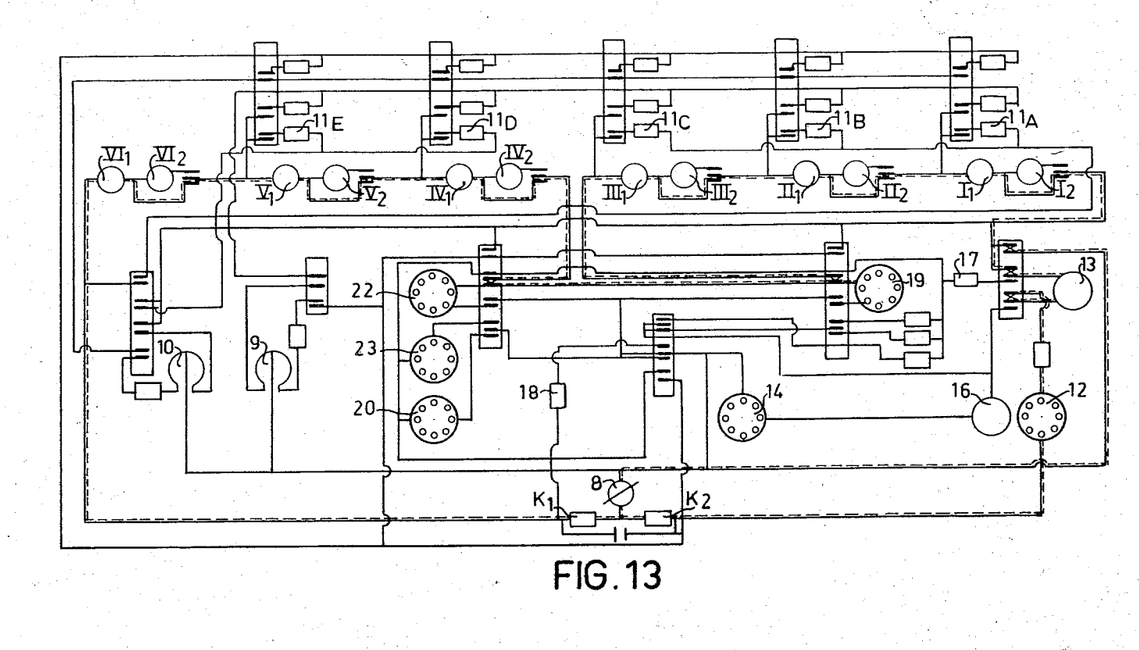
Figure 14:
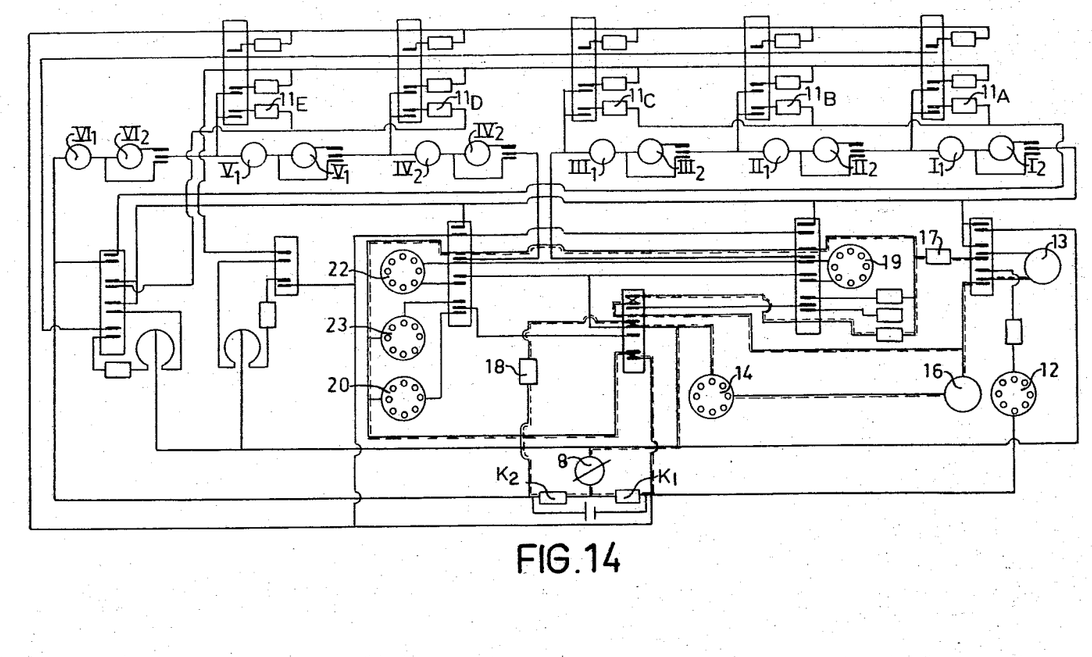
Figure 15:
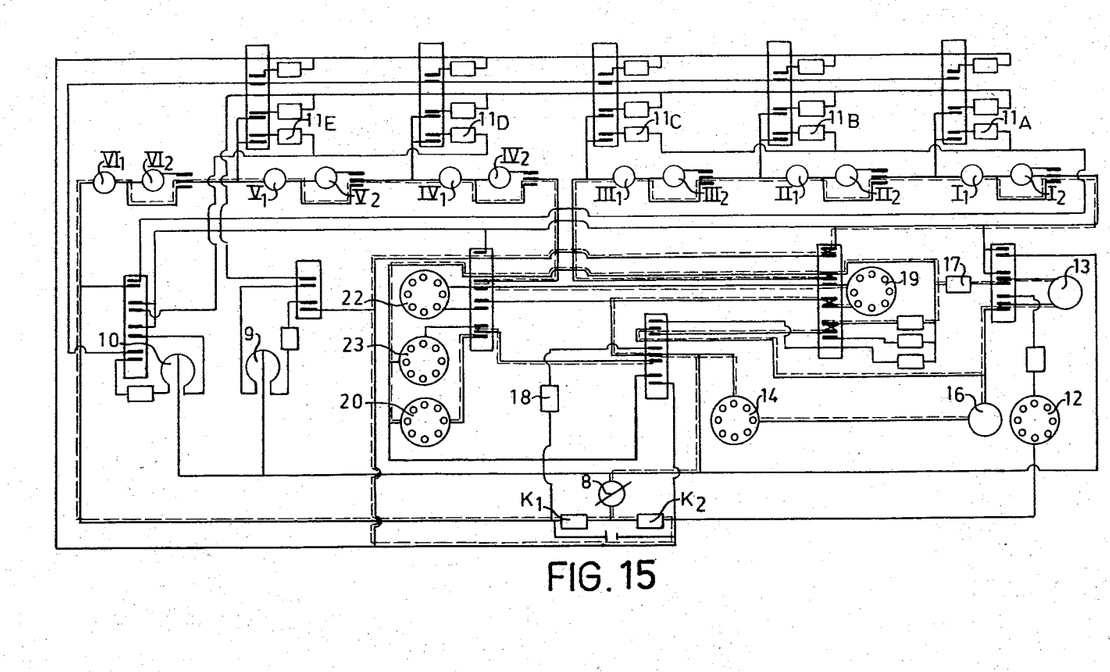
Figure 16:
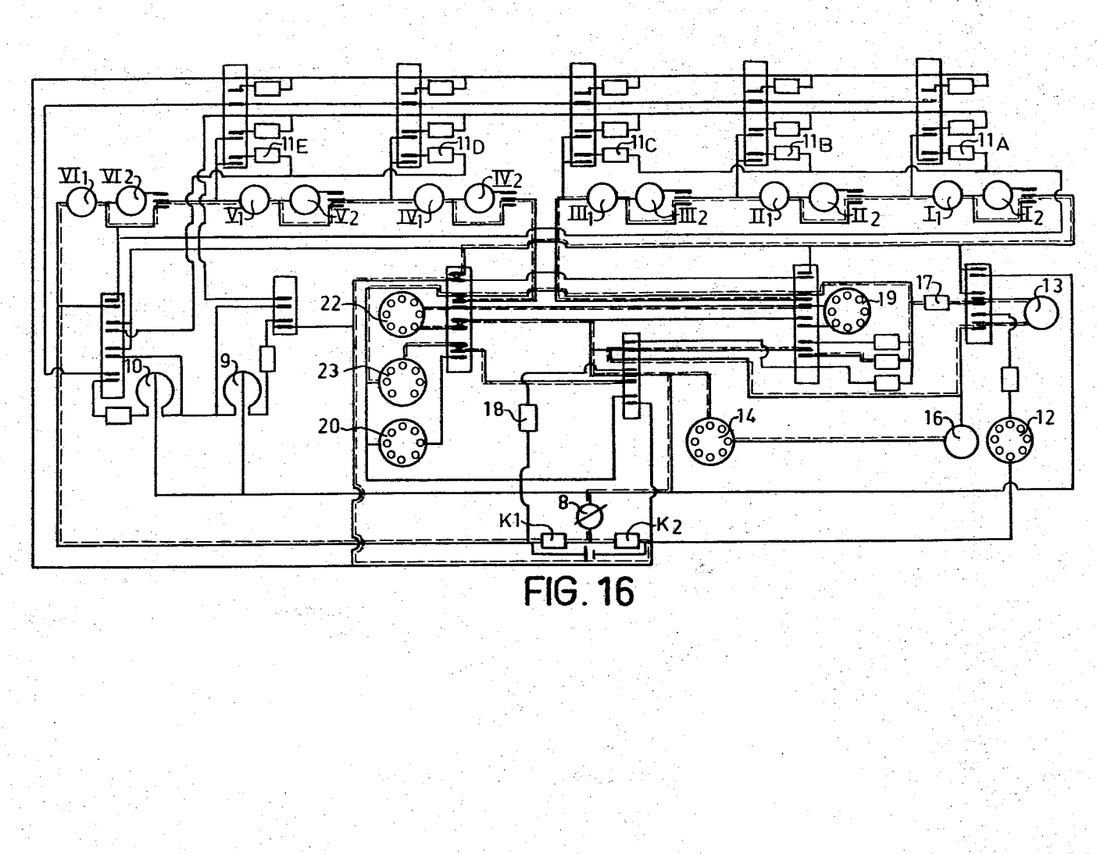

The key DW in the bottom row 29 is depressed when the dead weight is to be determined and then the circuit shown in FIG. 13 is established. When the stern draft (draught), means draft (draught) and bow draft (draught) are to be gauged, the tangents $d_A$, $d_M$ and $d_F$ respectively are depressed and the circuits according to FIGS. 14, 15 and 16 respectively are established.

In the following the working cycles for two different methods of using the device according to the invention will be briefly described;

(A) Gauging a suitable distribution of the cargo by a predetermined dead weight and trim.

(1) The predetermined dead weight is set at the dead weight multistep resistor 12 and the dead weight potentiometer 13.

(2) The key $d_M$ is depressed and the mean draft (draught) is read on the potentiometer 16 after the bridge circuit has been balanced.

(3) The potentiometer 16 for reading the draft (draught) is set at the desired value of the stern draft, whereafter the key $d_A$ is depressed.

(4) The potentiometers 1 of the resistor groups I–VI are set in such a way that the values of the dead weight and the stern draft (draught) remain unaltered.

(5) The key $d_F$ is depressed and the bow draft (draught) is read.

(6) The draft values according to points 3 and 5 are inserted in the diagram 25 and the corresponding draft values for the cross sections I–VI are read.

(7) The potentiometers 2 of the resistor groups I–VI are set to said draft (draught) values of the sections.

(8) The shearing forces and the bending moments are read in all the measuring planes by depressing the corresponding keys. Said reading can be made in the most suitable order of succession.

A great hogging moment is counteracted by transferring cargo from other parts of the vessel to spaces adjacent the measuring plane in question.

A great sagging moment is counteracted by transferring cargo from spaces adjacent the measuring plane in question to other parts of the vessel.

Great shearing forces are reduced by spreading the cargo more evenly along the cargo carrying space. The stern draft (draught) shall be kept constant during any transfer of the cargo and it is therefore advisable that the circuit for reading same should be connected when the cargo is redistributed. If trimming changes cannot be avoided when the cargo is redistributed, the potentiometers 2 of the resistor groups must be reset to the new values of the cross section drafts (draughts) corresponding to the new trim before the shearing forces and the bending moments are read.

(B) Calculation of dead weight, stern draft (draught), mean draft (draught), bow draft (draught), shearing forces and bending moments when the distribution of the cargo is known.

(1) The potentiometers 1 of the resistor groups I–VI are set to the cargo weights in the different cross sections.

(2) The dead weight, mean draft (draught), stern draft (draught) and bow draft (draught) are read in the manner previously stated.

(3) The drafts (draughts) of the different cross sections are established from the values of the bow and stern drafts (draughts) by the aid of the diagram 25.

(4) The potentiometers 2 of the resistor groups I–VI are set at said values for the cross section drafts (draughts).

(5) The shearing forces and bending moments for all the measuring planes A–E are read in the manner described above.

The invention thus provides a device by aid of which the effect of the cargo distribution can be gauged in a number of transverse planes or a given cargo can be distributed in such a way that the stresses of the vessel are kept at a minimum and the vessel is given the most advantageous trim. All the gaugings can furthermore be made without any manual calculations whatsoever, which to a great extent facilitates a rapid and easy cargo distribution.

The foregoing description is only an example of the construction of a device according to the invention and does not form a limitation for the scope thereof, especially in consideration of the fact that each such device must be especially constructed and calculated for the vessel with which it shall be used. It is for instance possible to design the instrument for calculating double shearing force and double bending moment. Using Equations 1, 2, 3 and 4 the following equations could be made:

$$2Q_N = \sum_1^n W_E + \sum_1^n W_P - \sum_1^n W_B -$$
$$\sum_{n+1}^m W_E - \sum_{n+1}^m W_P + \sum_{n+1}^m W_B \quad (2')$$

$$2M_B = \sum_1^2 m_{iE} + \sum_1^2 m_{iP} + m_{iB3} + \sum_4^6 m_{iE} + \sum_4^6 m_{iP} -$$
$$\sum_1^2 m_{iB} - m_{iE3} - m_{iP3} - \sum_4^6 m_{iB} - 1_B \cdot 2Q_N \quad (4')$$

The various potentiometers and resistors previously described as representing the various factors of these equations can easily be arranged in a similar bridge coupling to satisfy Equations 2' and 4'. For this type of coupling the shear force reading has to be made first and the shear force reading potentiometer with unchanged setting be used in the bending moment circuit to represent the last member of Equation 4'. The indication of single shear force and bending moment, which are the values wanted as a result, is only a question of graduation of the scales of the reading knobs. The coupling is always made so that factors with + sign are connected in series in one branch of the bridge and factors with − sign are connected in series in the other branch.

What I claim is:

1. A device for gauging the effect of the cargo distribution on the bending moments, shearing forces, deadweight and draft of a vessel, said device being constructed as a bridge circuit of the Wheatstone type which in known manner comprises two comparison resistors connected in series, two bridge branches shunting said comparison resistors connected in series, and a galvanometer for setting to zero connecting a point between said resistors with a point between said bridge branches, said device furthermore comprising a number of resistor groups, each representing a compartment of said vessel defined between two transverse sectional planes thereof and being consecutively arranged in series from the bow to the stern of said vessel, the resistances of each of said resistor groups being settable to represent the resultant force caused by the cargo weight, the hull weight and the buoyancy of the respective compartment and having fixed connectable and disconnectable resistors for transforming said resistance value representing the resultant force into a resistance value representing the bending moment of same with respect to an arbitrary main plane, said device also comprising:

a first changeover means having a first position for determining the shear force in an optional sectional plane (hereinafter termed the measuring plane) between said compartments, as well as a second changeover means for choosing said measuring plane in which first position said resistor groups are included in one branch of said bridge circuit, and a variable resistor is included in the other branch thereof, the resistor groups corresponding to the compartments on one side of the measuring plane also being short-circuited, whereby said variable resistor, when said galvanometer is set to zero, gives the shearing force in said measuring plane, said first changeover means also having a second position for determining the bending moment in an optional measuring plane, chosen by said second switching means, in which the resistor groups are included in one branch of said bridge circuit and those groups representing the compartments on one side of said chosen measuring plane are set to represent the moments of the resulting forces with respect to a sec- main plane, and the remaining resistor groups representing the compartments on the other side of said chosen measuring plane are set to represent the resulting forces or the respective compartments and are shunted by a fixed resistor transforming the sum of said resultant forces to the correspondng moment value with respect to said main plane, whereby another variable resistor included in the other branch of said bridge circuit indicates the bending moment in said chosen measuring plane when said galvanom- is reading zero.

2. A device as defined in claim 1 in which each resistor group representing one of said compartments of the vessel comprises a variable resistor adjustable to a resistance value corresponding to the cargo weight in said compartment, a counterconnected variable resistance in the same way settable to a resistance value corresponding to the buoyancy of said compartment and a fixed resistance, the resistance value of which in the same way representing the hull weight of said compartment, said resistor groups furthermore comprising resistances connectable and disconnectable to transform the inserted values of resistance representing cargo weight, buoyancy and hull weight into values representing the corresponding moments referred to the main plane, and a shunt connectable to short circuit the variable resistor for the buoyancy and the fixed resistance for the hull weight.

3. A device as claimed in claim 2 in which the resistor groups in a third position of the first switching means for determining the dead weight of said vessel, set to represent the load caused by the cargo in respective compartments, are included in one branch of said bridge circuit with the variable resistor for the buoyancy and the fixed resistance for the hull weight of each resistor group being short-circuited by the aid of their shunt, whilst a switchable multistep resistor and a variable resistor in series therewith are included in the other branch of the bridge circuit, said multistep resistor and said variable resistor together indicating the required dead weight of said vessel when said bridge circuit is balanced.

4. A device as claimed in claim 3, in which said variable resistor indicating the dead weight in a fourth position of said first switching means determining the mean draft of said vessel, set at a value arrived at when determining said dead weight, is included in one branch of the said bridge circuit in series with a variable resistance adjustable to indicate said means draft and a fixed resistance also in series with a further switchable multistep resistor coupled to the deadweight multistep resistor so that each step thereof corresponds to the draft increase due to a deadweight step, the deadweight variable resistor and its series fixed resistor being shunted by a further fixed resistance transforming the deadweight value of said into a corresponding value for draft corresponding to the draft increases within the intervals between successive steps of the further multistep resistor, and in which a fixed comparison resistance is included in the other branch of said bridge circuit so that the variable mean draft resistance indicates the required values when said bridge circuit is balanced.

5. A device as claimed in claim 4, in which said switching means in a fifth position for determining the draft at a measuring plane astern of said main plane is arranged to include those resistor groups representing the compartments ahead of said main plane and set to give the moment values thereof with respect to said main plane, in one branch of said bridge circuit in series with a switchable multistep resistor corresponding to the resulting trimming moment of the total hull weight and the total displacement with respect to said main plane at the actual means draught represented by the adjustment of the corresponding multistep resistor to which it is mechanically coupled, and wherein:

the resistor groups representing the compartments astern of said main plane and set at their moments with respect to said main plane, are included in the other branch of the bridge circuit in series with a series circuit comprising the variable resistance adjustable to indicate mean draft, the variable resistor adjusted to indicate the dead weight and said fixed resistance with another fixed resistance shunting the deadweight variable resistance and its series fixed resistance, the value indicated by the dead weight variable resistor being converted into values of draft corresponding to the draft increases and being corrected for the changes in trimming moment of the displacement due to changes in draft within the steps of said draft multistep resistor, the said series circuit being shunted by a switchable multistep resistor coupled to the said draft increase and deadweight multistep resistors and adjustable to such a value that said variable resistor to indicate the stern draft, when said bridge is balanced, gives the sum of the mean draft and the stern draft variation at the set value of the deadweight.

6. A device as claimed in claim 4, in which said switching means in a sixth position for determining the draft at the measuring plane ahead of said main plane is arranged to include those resistor groups representing the compartments astern of said main plane and set to give the moment value with respect to the said main plane, in one branch of said bridge circuit in series with a switchable multistep resistor corresponding to the resulting trimming moment of the total hull weight and the total displacement with respect to said main plane and the actual mean draft represented by the adjustment of the corresponding multistep resistor to which it is mechanically coupled, and wherein:

the resistor groups representing the compartments ahead of said main plane and set at their moments with respect to said main plane, are included in the other branch of the bridge circuit in series with a series circuit comprising the variable resistance adjusted to indicate mean draft.

the variable resistance adjusted to indicate the deadweight and said fixed resistance, with a further fixed resistance shunting the deadweight variable resistance and its series fixed resistance, the values indicated by the deadweight variable resistor being converted into values for draft corresponding to the draft increase and being corrected for the changes in trimming moment of the displacement due to changes in draft within the steps of draft multistep resistor, the said series circuit being shunted by a switchable multistep resistor, adjustable to such a value that said variable resistor coupled to said draft increase and deadweight multistep resistors and adjustable to indicate the bow draft, when said bridge is balanced, gives the sum of the means draft and the bow draft variation at the set value of the deadweight.

References Cited

UNITED STATES PATENTS

| 2,865,566 | 12/1958 | Swenson | 235—150.2 |
| 3,128,375 | 4/1964 | Grimnes | 235—179 |
| 3,329,808 | 7/1967 | Fisher | 235—193 |

FOREIGN PATENTS

| 685,743 | 5/1964 | Canada. |

MALCOLM A. MORRISON, *Primary Examiner.*

R. W. WEIG, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,441,721                                    April 29, 1968

Ferenc Arpas et al.

It is certified that error appears in the above identified patent and that said Letters Patent are hereby corrected as shown below:

Column 10, line 45, "the" should read -- their --; same line 45, "sec-" should read -- second --. Column 11, line 28, "said" should read -- same --.

Signed and sealed this 14th day of April 1970.

(SEAL)
Attest:

Edward M. Fletcher, Jr.                          WILLIAM E. SCHUYLER, JR.

Attesting Officer                                         Commissioner of Patents